(12) United States Patent
Wilcken et al.

(10) Patent No.: US 7,598,506 B2
(45) Date of Patent: Oct. 6, 2009

(54) LOW-TEMPERATURE ADJUSTABLE BLACKBODY APPARATUS

(75) Inventors: Stephen K. Wilcken, Des Moines, WA (US); Keith J. Davis, Seattle, WA (US)

(73) Assignee: The Boeing Company, Chicago, IL (US)

(*) Notice: Subject to any disclaimer, the term of this patent is extended or adjusted under 35 U.S.C. 154(b) by 196 days.

(21) Appl. No.: 11/615,043

(22) Filed: Dec. 22, 2006

(65) Prior Publication Data
US 2008/0149861 A1      Jun. 26, 2008

(51) Int. Cl.
*G01J 3/00* (2006.01)
(52) U.S. Cl. .............. 250/493.1; 250/495.1; 250/503.1; 250/504 R
(58) Field of Classification Search ............. 250/504 R, 250/493.1, 494.1, 495.1, 503.1
See application file for complete search history.

(56) References Cited

U.S. PATENT DOCUMENTS

| | | | | |
|---|---|---|---|---|
| 3,309,881 A | * | 3/1967 | Beerman | 374/2 |
| 4,598,206 A | * | 7/1986 | Nelson | 250/495.1 |
| 4,754,141 A | * | 6/1988 | Mindock | 250/343 |
| 5,003,184 A | * | 3/1991 | Hunt et al. | 250/504 R |
| 5,084,621 A | * | 1/1992 | Geiser | 250/353 |
| 5,227,628 A | * | 7/1993 | Turner | 250/286 |
| 5,898,495 A | * | 4/1999 | Manning | 356/452 |
| 6,018,146 A | * | 1/2000 | Uzgiris et al. | 219/405 |
| 6,057,550 A | * | 5/2000 | Thoma et al. | 250/352 |
| 6,166,317 A | * | 12/2000 | Volk, Jr. | 136/201 |
| 2007/0146887 A1 | * | 6/2007 | Ikeda et al. | 359/586 |
| 2007/0261429 A1 | * | 11/2007 | Teehan | 62/378 |
| 2008/0179547 A1 | * | 7/2008 | Henley | 250/492.21 |

\* cited by examiner

*Primary Examiner*—Jack I Berman
*Assistant Examiner*—Nicole Ippolito Rausch
(74) *Attorney, Agent, or Firm*—Yee & Associates, P.C.; Brook Assefa

(57) ABSTRACT

An adjustable, low-temperature blackbody radiation system includes a blackbody enclosure having an optical port formed therein, and a cold element provided within the blackbody enclosure adjacent the optical port, the cold element configured to emit thermal radiation through the optical port. A dry gas source is in fluid communication with the blackbody enclosure, and is configured to purge the blackbody enclosure with a gas. A temperature control system is coupled to the cold element to maintain the cold element at a predetermined temperature. A light trap feature (e.g., a dark mirror cube corner structure) is incorporated into and/or around the cold element.

17 Claims, 4 Drawing Sheets

LOW-TEMPERATURE ADJUSTABLE BLACKBODY APPARATUS

TECHNICAL FIELD

The subject matter described herein generally relates to thermal radiation heat transfer systems, and more specifically relates to low-temperature blackbody radiators.

BACKGROUND

A blackbody is an object that emits a mixture of electromagnetic radiation with a spectral content described by a statistical function called Planck's blackbody function. The spectral peak of this blackbody function is proportional to the absolute temperature (°K). The area under the blackbody function curve is proportional to the absolute temperature to the fourth power, and is proportional to the total power radiated by the blackbody.

Perfect blackbodies do not exist in nature, but blackbody devices can be built that closely emulate the radiant emittance of a blackbody over a limited spectral band and temperature range. A typical blackbody device includes an electrical heater element inside an insulated cavity. Blackbody devices have spectral radiance distributions that are easily calculated once the temperature is known and are therefore often used to calibrate infrared thermal cameras and other such imagers.

Blackbody devices that operate above ambient temperature are fairly easy to construct. However, due to very strong temperature dependence of the emitted spectrum of a blackbody device, when operated at low temperatures, the emissions are so small that they are very susceptible to contamination by reflected radiation from the surrounding warm environment as well as any self-emission from any intervening windows.

Prior art devices incorporate a cold, high-emissivity cavity or object (e.g., cold plate) in a thermally-shielded vacuum environment. The vacuum environment prevents frost accumulation, but it also necessitates locating the sensor inside the vacuum environment, or using an optical window which is transparent in the infrared range of the sensor. Accordingly, known low temperature blackbody devices are difficult to design and expensive to build.

Accordingly, it is desirable to provide improved low-temperature, adjustable blackbody systems that reduce stray thermal radiation from the surrounding environment, reduce frost build-up, are portable, easy-to-use, and reduce the effects of any window materials. Other desirable features and characteristics will become apparent from the subsequent detailed description and the appended claims, taken in conjunction with the accompanying drawings and the foregoing technical field and background.

BRIEF SUMMARY

Methods and apparatus are provided for an adjustable, low-temperature blackbody radiation system. In accordance with one embodiment, the blackbody system includes a blackbody enclosure having an optical port formed therein, and a cold element provided within the blackbody enclosure adjacent the optical port, the cold element configured to emit thermal radiation through the optical port. A dry gas source is in fluid communication with the blackbody enclosure, and is configured to purge the blackbody enclosure and prevent intrusion of moist air from the exterior. A temperature control system is coupled to the cold element to maintain the cold element at a predetermined temperature. A light trap feature (e.g., a dark mirror cube corner structure) is incorporated into and/or around the cold element.

BRIEF DESCRIPTION OF THE DRAWINGS

A more complete understanding of the various embodiments may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description. For the sake of brevity, conventional techniques and features related to thermal measurement systems, temperature controllers, and gas supply systems are not described in detail herein.

Figure 1:
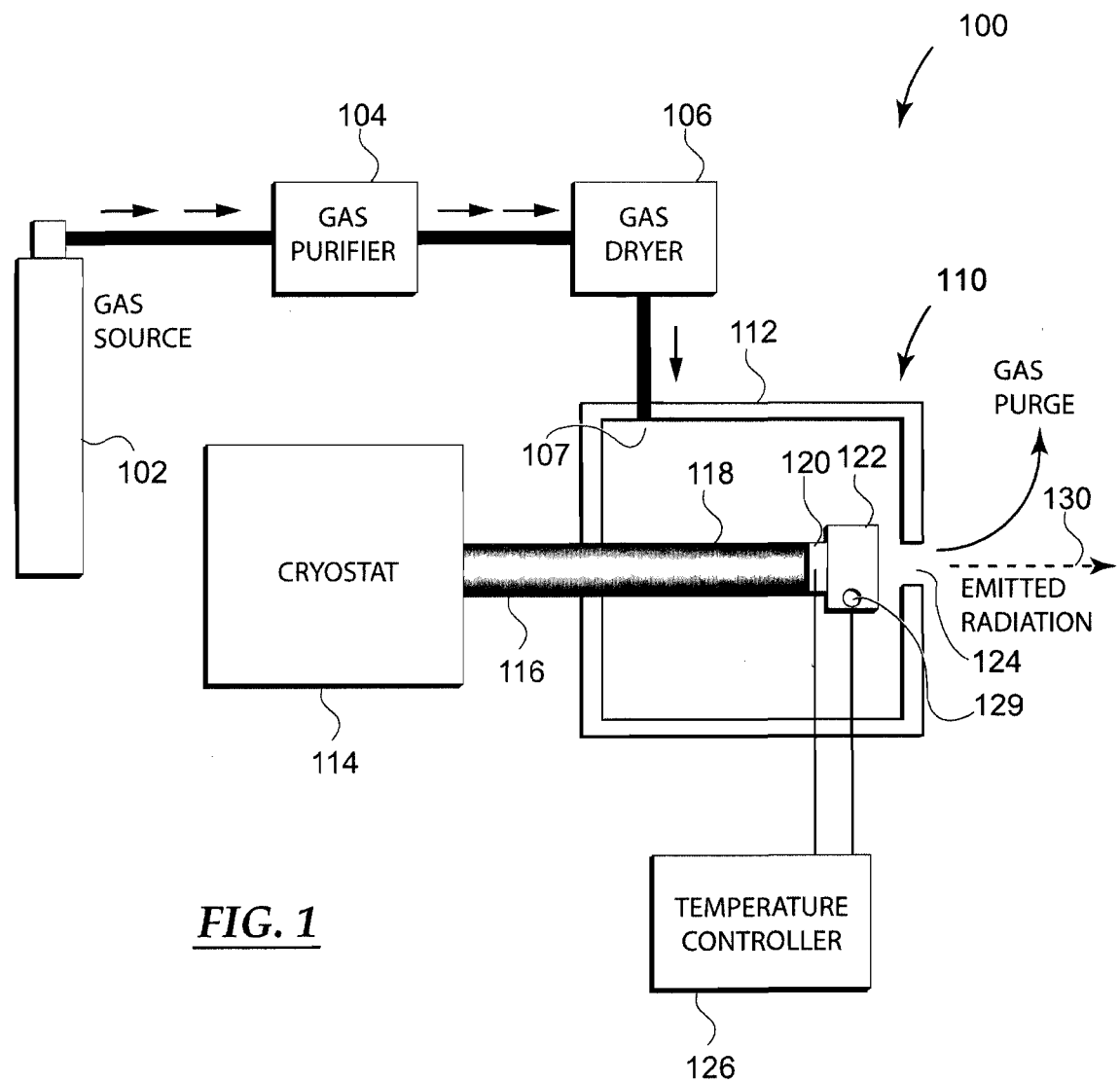
FIG. 1 is a schematic overview of an adjustable-temperature blackbody device in accordance with one embodiment.

Referring to FIG. 1, an exemplary adjustable, low-temperature blackbody radiation system 100 (alternatively referred to as "blackbody system," or simply "system") generally includes a blackbody enclosure (or "enclosure") 110 having an optical port (or "port") 124 formed therein and defining an inner volume 112. A cold element 122 is provided within enclosure 110 adjacent to optical port 124. A dry gas source 107 (e.g., a source of dry $N_2$) is in fluid communication with enclosure 110, and may be purged through port 124 or, in embodiments where a window component is placed over optical port 124, via any other suitable purging system, such as a gas purge port. This source of dry gas eliminates or reduces condensation on cold element 122 and other components within enclosure 110. In embodiments where a window component is placed over optical port 124, it is also possible to seal the enclosure after an initial purge, leaving a dry gas within the enclosure, and stopping the flow of gas.

Cold element 122 is thermally coupled to a cryostat 114 via a "cold finger" (or simply "finger") 116. A temperature control system (e.g., a temperature control system comprising temperature controller 126, a heating element 120, and a thermal sensor 129) is suitably coupled to cold element 122 and works in conjunction with cryostat 114 to maintain the cold element at a predetermined temperature. A light trap feature (not shown in FIG. 1) is incorporated into and/or otherwise interacts with cold element 122 to reduce the effects of reflected ambient radiation.

Thus, depending upon the temperature of cold element 122 (and the temperature of inner volume 112), thermal radiation 130 is emitted from port 124, and may be sensed by an appropriately configured thermal imaging system (not illustrated in FIG. 1). It will be appreciated that emitted radiation 130 is depicted, solely for the purposes of simplicity, as a linear ray. In practice, the actual radiation emitted from port 124 will have a more complex profile, as is known in the art. Having thus given a general overview of an exemplary embodiment, a detailed description of its various components will now be described.

Dry gas source 107 may comprise any suitably dry gas or combination of gasses. In one embodiment, dry nitrogen ($N_2$) is used; however, other gases, such as argon or a variety of noble gases, may also be employed. Dry gas source 107 preferably provides a gas having a dew point substantially lower than the desired operational range of heating element 120. In the illustrated embodiment, a gas source (e.g., a tank of compressed nitrogen) 102 is coupled to a gas purifier 104 and gas drier 106 to provide dry gas source 107.

Gas purifier 104 is any apparatus configured to purify the incoming stream of gas from source 102. In one embodiment, for example, gas purifier 104 is a two-stage molecular sieve type of gas purifier, as is known in the art. Similarly, gas dryer 106 may consist of any apparatus configured to dry the air to an acceptable level. In one embodiment, gas dryer 106 is a liquid nitrogen cold trap, such as the Model ATN1000 cold trap offered by Metra, Inc. A gas distribution manifold (not shown) may be incorporated into enclosure 110 in order to distribute the gas more uniformly.

Cryostat 114 is any apparatus configured to cool cold element 122 to a desired temperature (e.g., a cryogenic temperature). In the illustrated embodiment, cryostat 114 is a closed-cycle helium cryostat of the type known in the art, and includes a cold finger 116 extending to and in thermal communication with cold element 122. Such cryostats operate below 0° C., and can reach temperatures below −100° C.

Enclosure 110 may be of any suitable shape, orientation, and material. In one embodiment, for example, enclosure 110 is a conventional stainless steel, and has an inner volume of approximately 15,000 cubic centimeters. While FIG. 1 depicts port 124 (and the emitted radiation 130), facing to the right, the enclosure may be configured such that port 124 faces upward (with respect to gravitational forces).

Optical port 124 may be any size or shape, and may be situated anywhere along the periphery of enclosure 110. In one embodiment, for example, optical port 124 is substantially circular, and has a diameter of between 3.0 and 4.0 inches. It will be appreciated, however, that the range of embodiments is not so limited, and comprehends any size and shape of optical port 124. In general, it is desirable for optical port 124 to be very close to cold element 122 to avoid vignetting of the field-of-view of the sensor that is being calibrated. However, it is also desirable for the gap to be sufficiently large as not to substantially impede or disrupt the flow of purge gas exiting through port 124. In a particular embodiment, for example, a gap of about 0.5 inches to 1.0 inches is used.

Temperature controller comprises a P-I-D controller or other such controller capable of receiving temperature data from temperature sensor 129 and maintaining cold element 122 at a predetermined temperature via heating element 120. Heating element 120 may consist of, for example, thermal tape at the interface of cold element 122 and end 118 of finger 116, or may be wrapped around finger 116 adjacent to cold element 122. Temperature sensor 129 may be a thermocouple, diode, or any other suitable sensor device.

Figure 2:
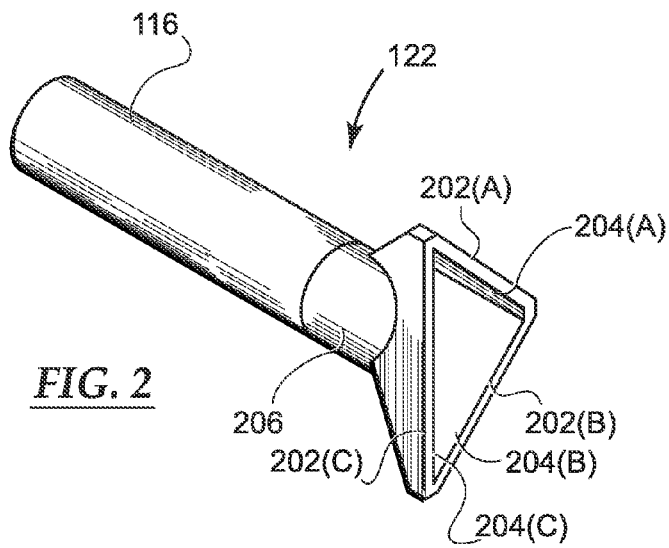
FIG. 2 illustrates an exemplary cube-corner structure in accordance with one embodiment.

As previously mentioned, cold element 122 preferably includes or is otherwise associated with or integrated into a light trap feature. The light trap feature includes any component or combination of components that reduces or eliminates the amount of ambient radiation reflected back to the infrared sensor (not shown). Referring to FIG. 2, for example, cold element 122 may include a "cube corner" configuration of orthogonal triangular planar regions 202(a)-(c), each of which has a corresponding inner surface 204(a)-(c). The cube corner structure is secured to anchor structure 206 (which may have any convenient shape), which itself is in thermal communication with finger 116. Alternatively, the cube corner structure may be incorporated directly into finger 116.

Figure 3:
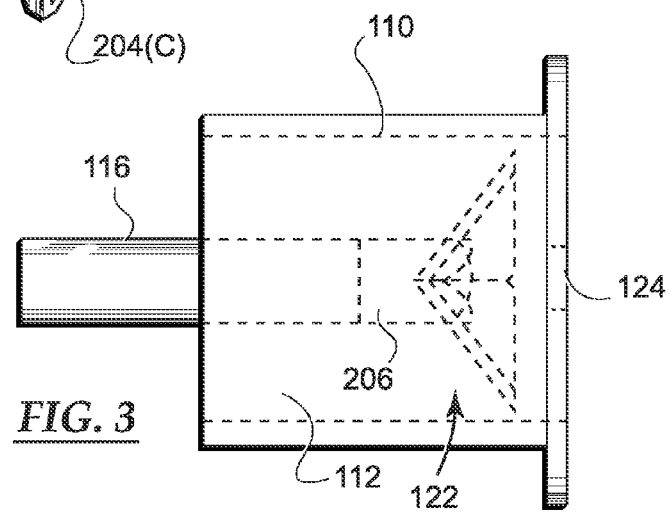
FIG. 3 is a side view of an exemplary blackbody device.
Figure 4:
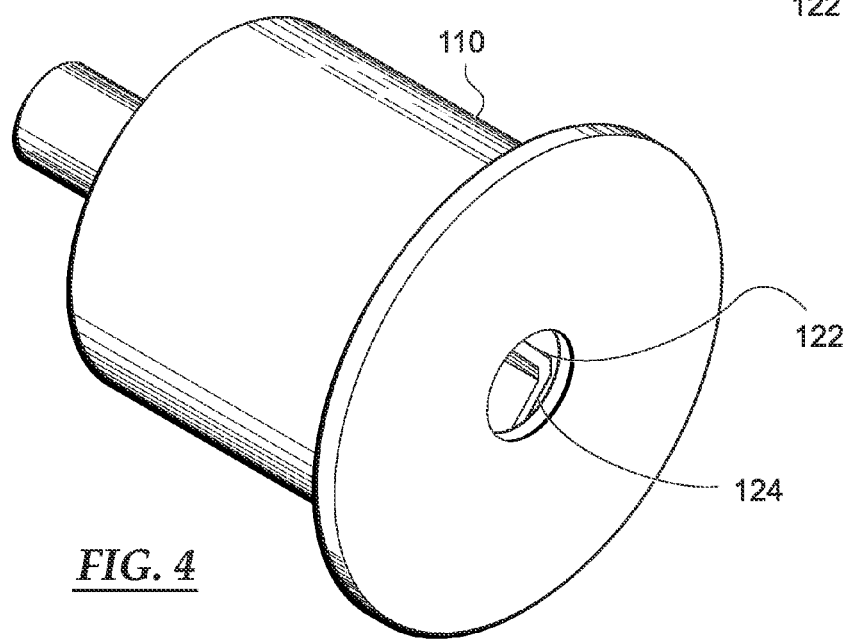
FIG. 4 is an isometric view of the blackbody device of FIG. 3.

FIGS. 3 and 4 show a side view and an isometric view of a system incorporating a cube corner light trap feature such as that shown in FIG. 2. Due to the geometry of the cube corner structure, any ray of radiation that enters port 124 within the +/−10 degree angular acceptance cone of the cube corner impinges on cube corner retroreflector surfaces 204 and experiences three internal reflections before being returned in the direction of the incident ray, but with a lateral offset.

Inner surfaces 204 of the cube corner are substantially smooth and specular (i.e., exhibit low optical scatter) across the infrared waveband of interest. Furthermore, surfaces 204 are provided with a dark mirror thin-film optical coating. Such coatings are effectively broadband antireflection multi-layer thin film coatings comprising a stack of materials that exhibit high optical absorption in the wavelength band of interest. These coatings typically have a reflectance that is less than two percent across the expected range of wavelengths and incident angles, and the reflections are predominantly specular. After three reflections from a specular, dark mirror coating applied to inner surfaces 204, the exiting ray will typically be reduced in intensity by over five orders of magnitude. Thus, when a sensor is positioned at port 124, the retroreflected radiance sent back to the sensor from the surrounding warm environment will be substantially reduced.

Figure 5:
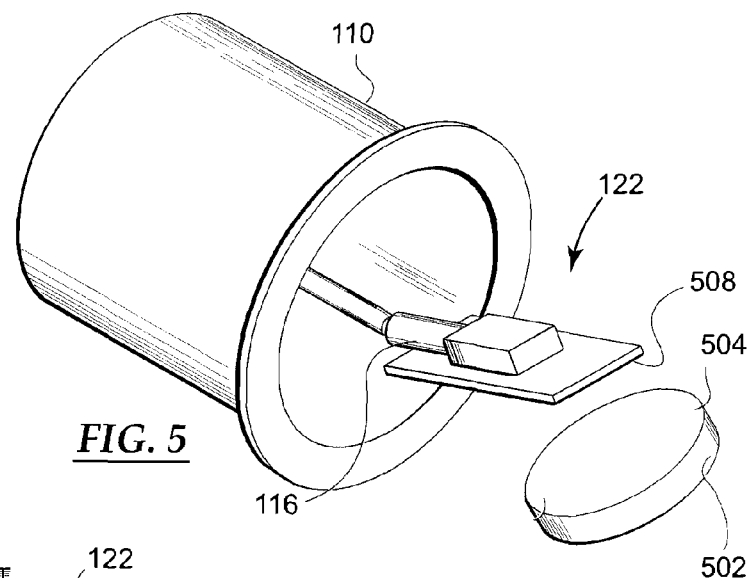
FIG. 5 is an isometric partial cut-away view of an alternate embodiment.
Figure 6:
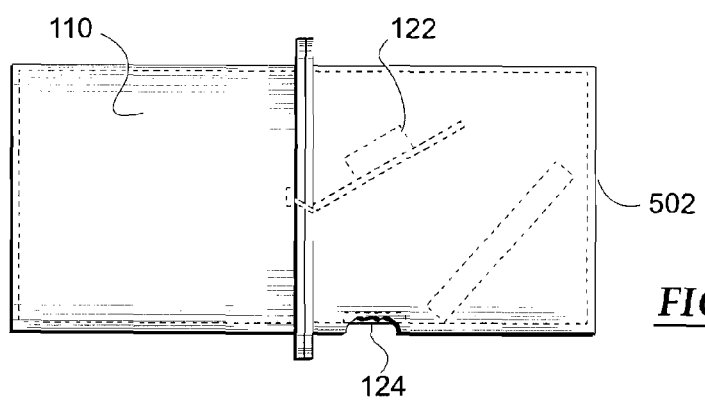
FIG. 6 is a side view of the blackbody device of FIG. 5.
Figure 7:
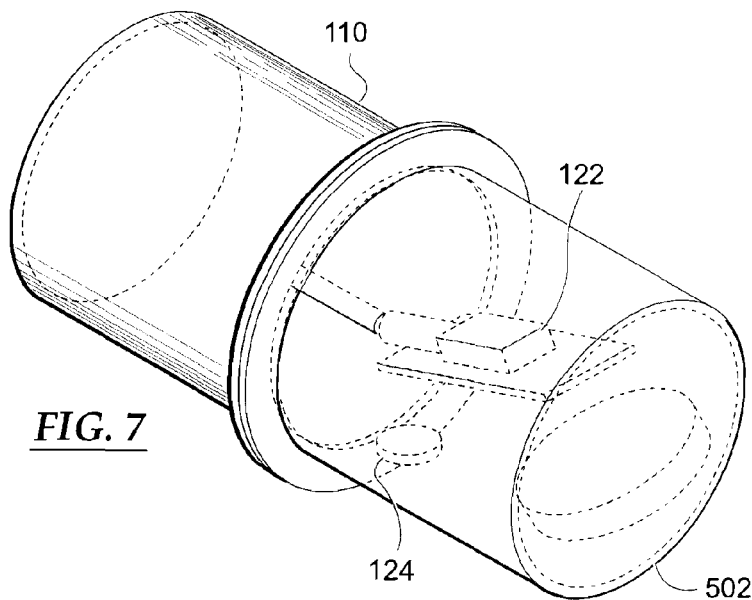
FIG. 7 is another view of the blackbody device of FIG. 6.

FIGS. 5-7 show a cut-away isometric view, a side view, and another side view of an alternate light trap structure incorporated into a blackbody system. This embodiment implements a reentrant type of retroreflective optical design, and includes a port 124, a high-emissivity cold plate 508 with a specular, dark mirror coating, and a low-emissivity concave mirror 502 having a coating (e.g., a gold coating) 504. Cold plate 508 may be angled, for example, 30 degrees with respect to port 124. Ambient radiation entering port 124 reflects off of cold plate 508 onto concave mirror 502, whereupon it is reflected back toward the lateral end of cold plate 508, where a small image of port 124 is formed. This radiation arrives at near normal incidence, and thus returns along its original path and exits port 124. After three reflections from the dark mirror coating on cold plate 508, the intensity of the rays leaving port 124 are significantly reduced. Other light trap structures may also be used, including cone structures, cavities, and other designs known in the prior art. The cube corner embodiment, however, is desirable in that it is relatively compact.

Figure 8:
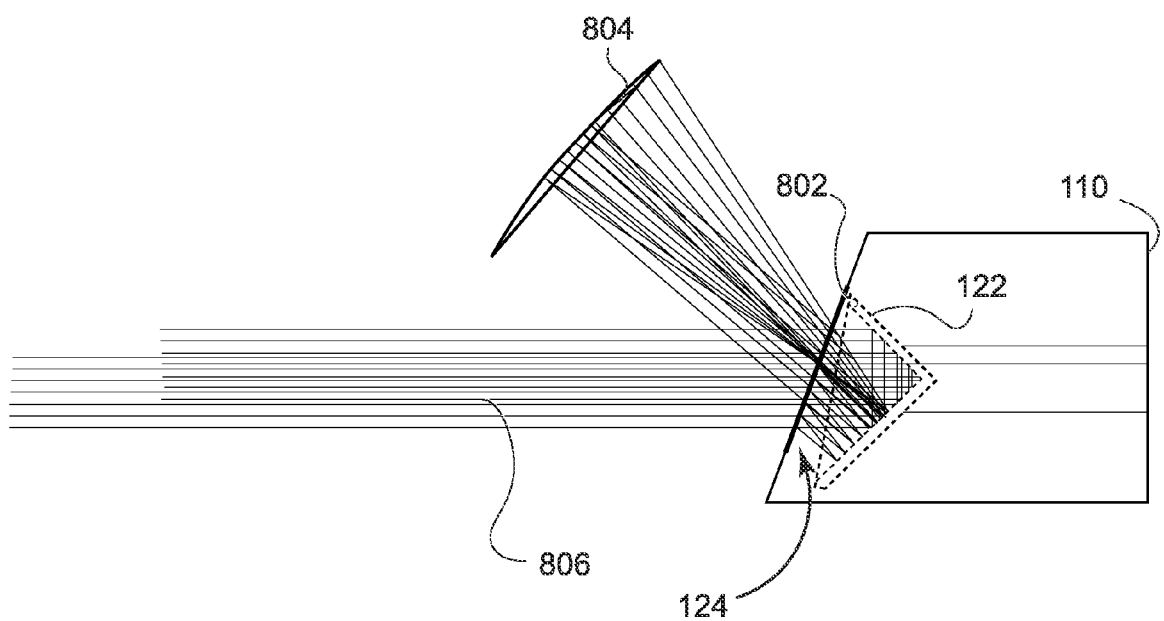
FIG. 8 is a side view of another alternate embodiment.

FIG. 8 shows an alternate embodiment incorporating a window over the port opening, but which compensates for window reflections. More particularly, enclosure 110 includes a port 124 that is covered by a window 802. A concave (e.g., parabolic) mirror 804 is positioned outside of enclosure 110 to reduce reflected radiant energy, and a retroreflective cube corner structure coated with a specular dark mirror coating is used for cold element 122, as described above. Rays 806 depict ambient radiation energy entering and exiting the system. In this embodiment, a static dry gas environment may be preferable to a continuous purge.

Window 802 may comprise any suitable material with appropriate thickness. In one embodiment, window 802 is a germanium substrate having a thickness of about 0.25-1.0 mm with a conventional anti-reflective coating provided thereon. In the illustrated embodiment, the focal axis of mirror 804 is approximately 20 degrees from the intended viewing axis. Other configurations may also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. In this regard, the term "exemplary" is used in the sense of "example," rather than in the sense of a preferred or model embodiment. The foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A low-temperature blackbody radiation system comprising:
   a blackbody enclosure having an optical port formed therein;
   a cold element provided within the blackbody enclosure adjacent the optical port, the cold element configured to emit thermal radiation through the optical port, wherein the cold element includes a specular dark mirror-type thin film optical coating configured to provide wavelength-specific functionality;
   a dry gas source in fluid communication with the blackbody enclosure, the dry gas source configured to purge the blackbody enclosure with a gas;
   a temperature control system coupled to the cold element, the temperature control system configured to maintain the cold element at a predetermined temperature; and
   a configurable light trap feature incorporated into the cold element, wherein the light trap feature is specular and reduces reflected ambient radiation by at least five orders of magnitude.

2. The blackbody radiation system of claim 1, further comprising a gas source, a gas purifier coupled to the gas source, and a gas drier coupled to the gas purifier, wherein the gas drier provides the dry gas source.

3. The blackbody radiation system of claim 2, wherein the gas source comprises a compressed $N_2$ gas cylinder.

4. The blackbody radiation system of claim 2, wherein the gas source comprises a boiled-off liquid cryogen.

5. The blackbody radiation system of claim 1, wherein the temperature control system comprises a cryostat thermally coupled to the cold element, and a temperature controller coupled to the cold element via a thermocouple and heating element.

6. The blackbody radiation system of claim 5, wherein the cryostat comprises a helium-based mechanical cryostat.

7. The blackbody radiation system of claim 1, wherein the wavelength-specific functionality is selected from the group consisting of 3-5 microns and 7.5-13 microns.

8. The blackbody radiation system of claim 1, further including a gas diffusion system within the blackbody enclosure.

9. The blackbody radiation system of claim 1, wherein the light trap feature comprises a cube-corner reflector.

10. The blackbody radiation system of claim 1, wherein the gas is purged through the optical port.

11. The blackbody radiation system of claim 1, further including an infrared-transparent window over the optical port, wherein the blackbody enclosure comprises a sealed, substantially dry gas environment.

12. A method for producing low-temperature blackbody radiation, comprising:
   providing a blackbody enclosure having an optical port formed therein;
   providing a cold element within the blackbody enclosure adjacent the optical port, the cold element incorporating a configurable light trap feature, wherein the light trap feature is specular and reduces ambient radiation by at least five orders of magnitude;
   emitting thermal radiation through the optical port;
   purging the blackbody enclosure with a gas; and
   maintaining the cold element at a predetermined temperature, wherein the cold element includes a specular dark mirror-type thin film optical coating configured to provide wavelength-specific functionality.

13. The method of claim 12, wherein purging the blackbody enclosure includes purging the blackbody enclosure using a substantially dry gas.

14. The method of claim 12, wherein maintaining the cold element at a predetermined temperature includes providing a temperature control system coupled to the cold element via a thermocouple and heating element.

15. The method of claim 12, wherein purging the blackbody enclosure includes purging the gas through the optical port.

16. The method of claim 12, wherein providing the cold element includes providing a light trap feature comprising a cube-corner reflector.

17. A low-temperature blackbody radiation system comprising:
   a blackbody enclosure having an optical port formed therein;
   a cold element comprising a specular dark mirror-type thin film optical coating configured to provide wavelength-specific functionality provided within the blackbody enclosure adjacent the optical port, the cold element configured to emit thermal radiation through the optical port;
   a dry gas source in fluid communication with the blackbody enclosure, the dry gas source configured to purge the blackbody enclosure with a gas;
   a temperature control system coupled to the cold element, the temperature control system configured to maintain the cold element at a predetermined temperature, wherein the temperature control system comprises:
      a cryostat thermally coupled to the cold element; and
      a temperature controller coupled to the cold element via a thermocouple and heating element;
   a gas source, wherein the gas source comprises a boiled-off liquid cryogen;
   a gas purifier coupled to the gas source;
   a gas drier coupled to the gas purifier, wherein the gas drier provides the dry gas source;
   a gas diffusion system within the blackbody enclosure; and
   a configurable light trap feature configured as a corner cube reflector incorporated into the cold element wherein the corner cube reflector is specular and reduces reflected ambient radiation by at least five orders of magnitude.

* * * * *